May 30, 1950  C. C. MAY  2,509,573
MELON CARRIER
Filed Jan. 10, 1947

C. C. May
INVENTOR

BY CA Snow & Co.
ATTORNEYS.

Patented May 30, 1950

2,509,573

UNITED STATES PATENT OFFICE 2,509,573

MELON CARRIER

Cal C. May, Jewett, Tex.

Application January 10, 1947, Serial No. 721,276

1 Claim. (Cl. 224—49)

By way of illustration, it might be stated that when harvesting watermelons, it is customary to drive the truck or wagon as near the growing plants as possible, and then carry the melons from the field to the truck or wagon. Usually the melons are carried one at a time from the field to the truck or vehicle and frequently melons are dropped causing the melons to split or burst.

It is, therefore, the object of the present invention, to provide a carrier which may be used in carrying melons from the field to the truck or wagon in which they are carried from the field.

An object of the invention is to provide carriers of this type wherein a melon may be carried in each hand from the field.

Another object of the invention is to provide a carrier which may be positioned adjacent to a melon, to the end that the melon may be rolled into the carrier or sling and held in such a way that the melon will not roll from the carrier when being transported to the truck or wagon.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
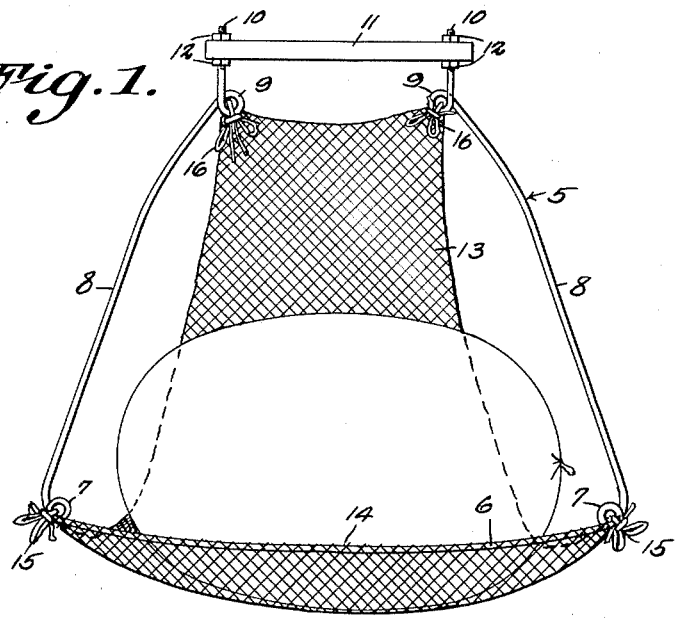
Figure 1 is an elevational view of a carrier constructed in accordance with the invention, illustrating a melon as placed therein for transportation.
Figure 2:
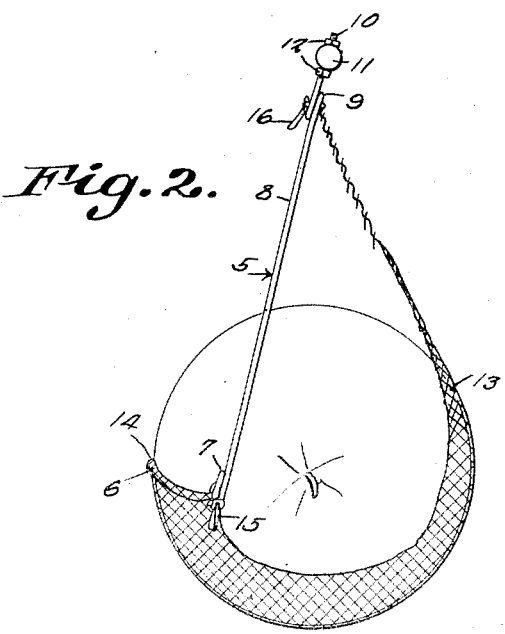
Figure 2 is an end elevational view thereof.

Referring to the drawing in detail, the carrier, which is in the form of a sling, comprises a frame which is constructed of heavy wire material 5, the length of heavy wire material being bent to provide a forward bar 6 with loops 7 at its ends, from where the length of wire material extends upwardly and inwardly providing side rods 8 with loops 9 formed adjacent to the upper ends thereof, the ends of the side rods 8 terminating in upwardly extended threaded ends 10.

These threaded ends 10 are extended through openings formed in the handle 11, there being provided nuts 12 on opposite sides of the handle, to secure the frame to the handle.

The reference character 13 indicates the flexible portion of the carrier or sling, and includes a length of woven or net material constructed in such a way as to provide a wide end 14 which is secured around the front bar 6 of the carrier, there being provided ties 15 at the corners thereof, the ties to be extended through the loops 7, securing the woven or net material to the front bar.

The woven or net material is formed with a narrow end section having ties 16 that tie into the loops 9, securing this end of the sling or woven or net material to this portion of the frame.

From the foregoing it will be seen that when it is desired to carry a melon in the carrier or sling, it is only necessary to move the forward bar 6 to a position adjacent to one side of the melon. The melon may now be rolled into the sling. When the sling or carrier is lifted by means of the handle, the weight of the melon will cause the sling or carrier to fall below the front bar 6, thereby insuring against a melon rolling from the sling.

It will further be seen that due to the construction of the sling, two melons may be carried simultaneously, thereby greatly reducing the time required in harvesting melons, and at the same time relieving the harvesters of walking, to an appreciable extent.

What is claimed is:

A melon carrier, comprising a length of heavy wire material constructed to provide vertical side members and an upwardly curved horizontal bar extending forwardly from the lower ends of the side members, loops connecting the side members and forwardly extended horizontal bar, loops formed adjacent to the free ends of the side members, a rigid handle to which the free ends of the side members are secured, said loops providing yieldable connections between the side members and the horizontal bar, the loops at the free ends of the side members providing resiliency between the rigid handle and side bars, a flexible mesh carrying member secured to the forwardly extended bar, throughout the entire length thereof, and securing strings at the corners of the flexible mesh carrying member secured within the loops, securing the carrier member to the side members and forwardly extended bar at the ends of the bar.

CAL C. MAY.

REFERENCES CITED

The following references are of record in the file of this patent:

UNITED STATES PATENTS

| Number | Name | Date |
| --- | --- | --- |
| 466,670 | Fler | Jan. 5, 1892 |
| 882,722 | Stark | Mar. 24, 1908 |

FOREIGN PATENTS

| Number | Country | Date |
| --- | --- | --- |
| 7,876 | Norway | Jan. 2, 1900 |